United States Patent [19]

Kang et al.

[11] Patent Number: 4,829,452

[45] Date of Patent: May 9, 1989

[54] SMALL ANGLE IMAGE ROTATION USING BLOCK TRANSFERS

[75] Inventors: Sang-Chul Kang, Irvine; Zoltan Z. Stroll, Rancho Palos Verdes; Stephen C. Miller, Costa Mesa, all of Calif.

[73] Assignee: Xerox Corporation, Stamford, Conn.

[21] Appl. No.: 627,995

[22] Filed: Jul. 5, 1984

[51] Int. Cl.⁴ .............................................. G06F 15/20
[52] U.S. Cl. .................................... 364/518; 364/521; 340/727; 382/46
[58] Field of Search ......................... 382/46; 340/727; 364/518, 521

[56] References Cited

U.S. PATENT DOCUMENTS

| | | | |
|---|---|---|---|
| 3,976,982 | 8/1976 | Eiselen | 340/727 X |
| 4,168,488 | 9/1979 | Evans | 382/46 |
| 4,267,573 | 5/1981 | Chaikin | 382/46 |
| 4,271,476 | 6/1981 | Lotspiech | 382/46 |
| 4,283,765 | 8/1981 | Rieger | 382/46 X |
| 4,481,509 | 11/1984 | Sasaki et al. | 364/518 X |
| 4,545,069 | 10/1985 | Kermisch | 382/46 |
| 4,554,638 | 11/1985 | Iida | 364/521 |

Primary Examiner—Gary Chin
Assistant Examiner—Joseph L. Dixon
Attorney, Agent, or Firm—Robert E. Cunha

[57] ABSTRACT

A simplified method for rotating a digital image through a small angle without the need for interpolation is described. The image is divided into small, square blocks, arranged in horizontal rows where each block is exactly to the left or right of the other blocks in the row, and into columns where each block in the column is offset to the right by one pixel with respect to the next higher block. The rotation is then accomplished by moving the lower rows to the left so that the columns are exactly vertical, and by moving the rightmost columns in a downward direction so that each block is one pixel below the block to its left. The result is a rotation of the image through a small angle. There is a considerable simplification gained from not rotating the data within each block which results in a slight distortion of the image, but for small angles, this is not noticeable.

4 Claims, 2 Drawing Sheets

SMALL ANGLE IMAGE ROTATION USING BLOCK TRANSFERS

BACKGROUND OF THE INVENTION

An algorithm for rotating an image in memory through a small angle is described.

In a graphics composition station, text is entered into the system in character coded form, either through telephone lines, in the form of magnetic media, or the like. Similarly, images can be input by scanning originals, or by receiving the information on phone lines. The composition station can then create documents by arranging the images and text on the output pages.

For quality graphic composition, the operator should have the capability of rotating the image through any small angle. A minimum capability of rotating the image through angles of up to about five degrees is required.

The obvious way to rotate an image is to store the original image in one area of memory, and assemble a rotated image in a second area of memory by transferring each pixel from one image to the other. However, there is a serious problem with this method. That is, as the image is rotated, the pixels from the original image matrix will fall between the pixel locations in the second area of memory. For this reason, interpolation must be applied to each pixel. Thus, for any arbitrary angle, there must be a series of computations performed for each pixel, which will result in low speed operation. The alternative is to process the data in hardware, which will increase the cost of the system. There is a need for a simplified, high speed algorithm for rotating images through small angles.

SUMMARY OF THE INVENTION

The basic concept is to divide the image into blocks, and to rotate the blocks without rotating the pixels within the blocks. This results in a reduced computational workload on the system, and higher speed.

The image to be rotated is divided into small blocks of image data, roughly formed into rows and columns. Each block is directly to the right (or left) of the one next to it on the same row. However, in the vertical dimension, each block is offset from the one above by the angle through which the image is to be rotated. Now the rotation is accomplished by transferring each block of image information from that area of memory where it originally resided to a second area of memory where the new, rotated, image resides, the transfer being accomplished as follows. First, the first column of blocks is transferred by transferring it block by block, and by placing each block directly below the preceeding one. Since the blocks were offset from each other by the desired angle of rotation, this accomplishes the desired rotation in one direction. Second, each block in the second column is placed alongside of its corresponding block in the first column, but slightly lower, the amount being determined by the desired angle of rotation. This causes rotation by the desired angle in the other direction. Finally, the remainder of the columns are transferred in the same way, to complete the process. The result is a rotation of the image through a desired angle in one transfer of data. Also, since the data is transferred in blocks, and since the data within the blocks is not rotated at all, little processing time is required, resulting in high speed operation. There is a certain amount of skewing of the data, since the entire image is rotated, but the data within each block is not. However, for small angles, this effect is not noticeable.

DETAILED DESCRIPTION OF THE INVENTION

Figure 1:
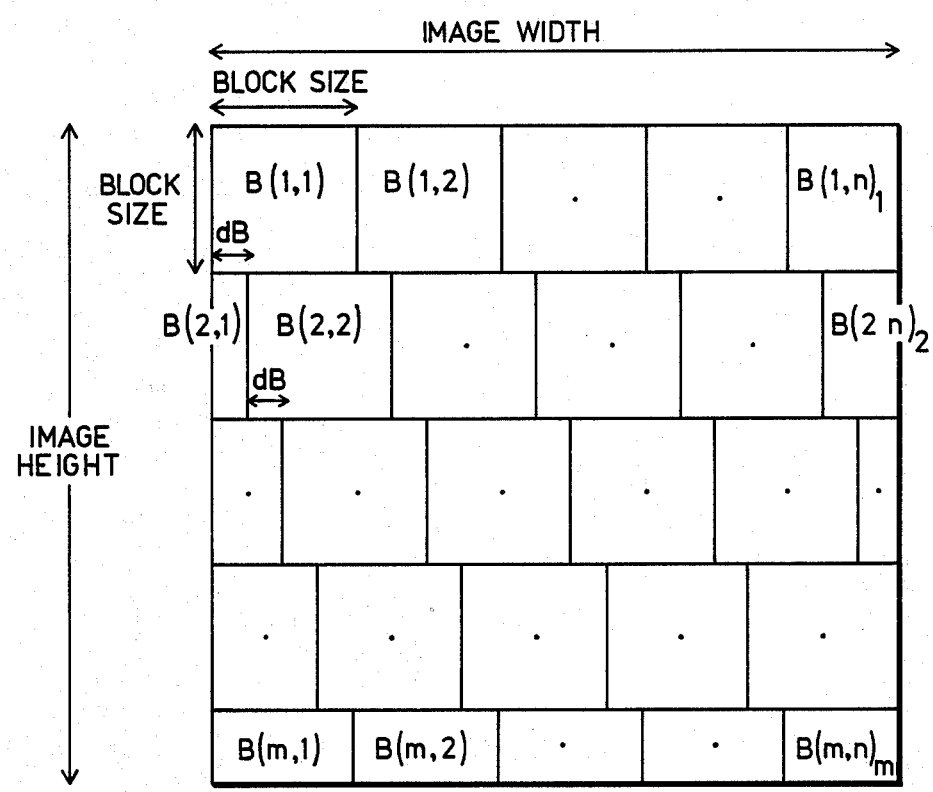
FIG. 1 is a diagram of the image before rotation.

FIG. 1 shows an original image (of size: Image Width pixels/scanline, ImageHeight scanlines) which is divided into blocks (B) that can be transferred from one area of memory to another. Using two constants, BlockSize and dB (delta B), which are determined by a given RotationAngle, the width, $W(i,j)$ and the height, $H(i,j)$ of the block, $B(i,j)$ can be calculated.

An initial consideration is that the smaller dB is, the smoother the resultant image will be. However, there is a limit; the width can be no less than one pixel. Therefore, dB is normally set to one.

The first step is to find the block size.

BlockSize=dB/tan (Rotation Angle)=1/tan Rotation Angle=180/(PI×[Rotation Angle])

Assuming that dB=1, and that the tangent of an angle equals the angle for small values, then the block size for a rotation of 5 degrees would be 11. Note that there cannot be a fractional solution to this equation, the number of pixels must be an integer, so the closest integer is used. In terms of FIG. 1, the dimensions of all of the square blocks of data are 11 by 11 pixels.

Now the dimensions of partial blocks can be determined. In terms of the variables i and j, partial blocks are also counted. The numbering proceeds from the left edge of the image regardless of the size of the block. The width of the blocks at the edge of the image are equal to $((i-1) \times dB)$ MOD BlockSize. That is, the width of the leftmost block in the third row is $3-1=2$ pixels wide.

The width of the blocks at the right edge are the Image size minus the number of previous pixels in the row. For row 3, there are four full blocks (44 pixels) and the first partial block (2 pixels). The image size is 50 so the last block is 4 pixels wide.

Figure 2:
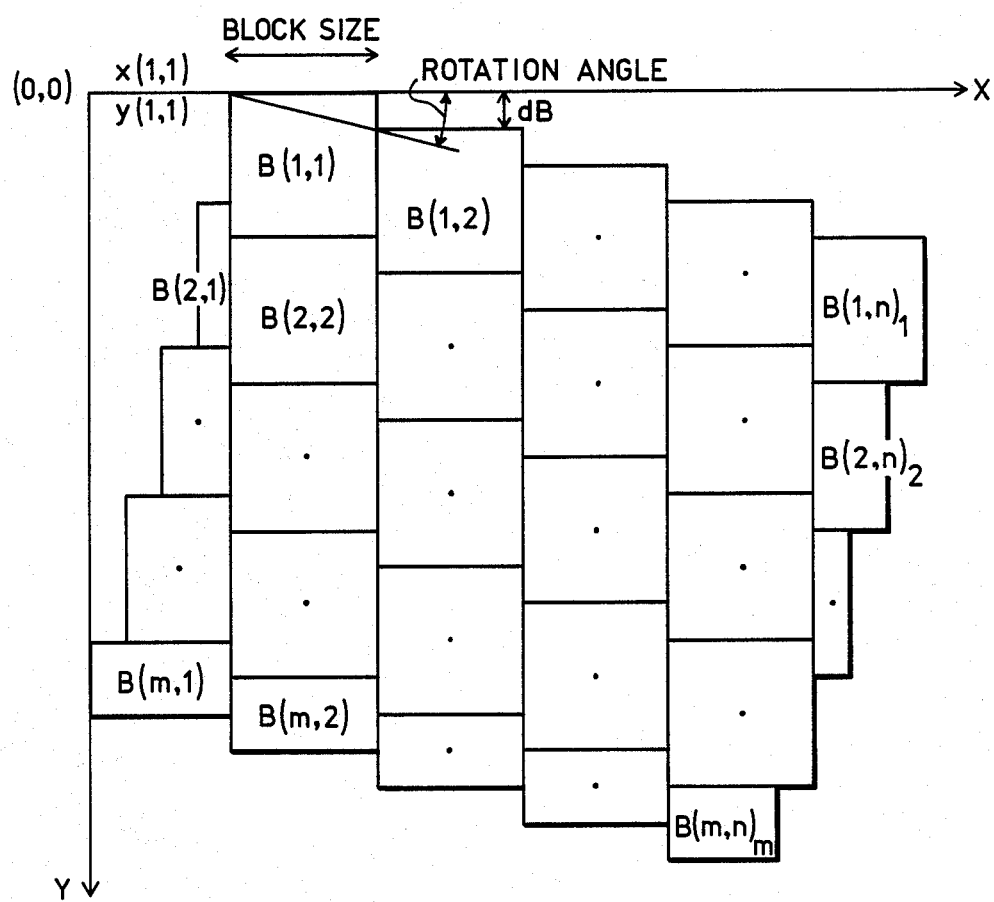
FIG. 2 is a diagram of the image after rotation.

The height of the last row of pixels is calculated similarly, the height is the remainder of the Image size (50 in this example) divided by the block size (11) to give a remainder of 6 pixels. At this point, the size of all the blocks of FIG. 1 have been determined. The equations for these relationships are as follows:

For all $i, 1 \leq i \leq m$
$W(i,j) = W_i$, when $W_i \neq 0$ and $j=1$
where $W_i = \{(i-1)*dB\}$ MOD BlockSize, when RotationAngle $\leq 0$
$= $ BlockSize $- \{(i-1)*|db|\}$ MOD BlockSize, when RotationAngle $< 0$ $= $ ImageWidth $- \sum_{k=1}^{n_i-1} W(i,k)$ when $j = n_i = $ the number of blocks in the row i
$= $ BlockSize, otherwise
For all $j, 1 \leq j \leq n_i$
$H(i,j) = H_m$, when $H_m \neq 0$ and $i=m$
where $H_m = $ ImageHeight MOD Blocksize
$= $ BlockSize, otherwise The next step is to determine the locations to which these blocks are to be transferred. The relative motion of the blocks as a result of this transfer can be described as a horizontal shearing component displacing the lower rows to the left, and a vertical shearing component displacing the resultant vertical columns located to the right in a downward direction. This is shown graphically in FIG. 2. The first block B(1,1), is located with its upper left corner at point (x(1,1), y(1,1)). Successive blocks in the first row, B(l,j) are located (j−1) pixels below the first block, and ((j−1) BlockSize ) pixels to the right. To the left of the first block, each succeeding block is located ((i−1) BlockSize)−1 pixels below the first block, and (i−1) pixels to the left. The first pixel position of the B(i,j), x(i,j) and y(i,j) in the rotated image space are as follows:

$$x(1,1)=(m-1)*dB, \text{ when RotationAngle} \geqq 0$$
$$=0, \text{ when RotationAngle}<0$$
$$x(i,1)=x(i-1,1)-dB, 1<i\leqq m$$
$$x(i,j)=x(i,j-1)+W(i,j-1), 1\leqq i\leqq m, 1<j\leqq n_i$$
$$y(1,1)=0, \text{ when RotationAngle}\geqq 0$$
$$=(n_1-1)*|dB|, \text{ when RotationAngle}<0$$
$$y(i,1)=(i-1)*\text{BlockSize}-\{\text{BlockSize}-1+(i-1)*dB\}/\text{BlockSize}*dB,$$
$$\text{when RotationAngle}\geqq 0$$
$$=y(1,1)+(i-1)*\text{BlockSize}-(i-1)*dB/\text{BlockSize}*|dB|,$$
$$\text{when RotationAngle}<0,$$
$$\text{for } 1<i\leqq m$$
$$y(i,j)=y(i,j-1)+dB, 1\leqq i\leqq m, 1<j\leqq n_i$$

It is to be understood that in all discussions in this specification and claims, the description and equations apply to vertical as well as horizontal, and clockwise as well as counterclockwise, variations. Also, the blocks may be rectangular.

While the invention has been described with reference to specific embodiments, it will be understood by those skilled in the art that various changes will be made and equivalents may be substituted for elements thereof without departing from the spirit and scope of the invention. In addition, many modifications may be made without departing from the essential teachings of the invention.

What is claimed is:

1. A method of the clockwise rotation of less than forty-five degrees of an image stored in memory in the form of blocks of digital bits comprising the steps of:

dividing the image into rows and columns of blocks, each block in each row located exactly to the right or left of the other blocks in the same row, and each block in each column offset a number of bits to the right of the position of the block above it, said offset being a smaller number of bits than there are bits in the vertical and horizontal dimensions of said block, and rearranging the image blocks so that each block in each column is exactly above or below the other blocks in the column, and each block in each row is said number of bits below the position of the block to its left.

2. A method of the clockwise rotation of less than forth-five degrees of an image stored in memory in the form of blocks of digital bits comprising the steps of:

dividing the image into rows and columns of blocks, each block in each column located exactly above or below the other blocks in the same column, and each block in each row offset a number of bits above the level of the block to its left, said offset being a smaller number of bits than there are bits in the vertical and horizontal dimensions of said block, and rearranging the image blocks so that each block in each row is exactly to the right or left of the other blocks in the row, and each block in each column is said number of bits to the left of the position of the one above it.

3. A method of the counterclockwise rotation of less than forty-five degrees of an image stored in memory in the form of blocks of digital bits comprising the steps of:

dividing the image into rows and columns of blocks, each block in each row located exactly to the right or left of the other blocks in the same row, and each block in each column offset a number of bits to the left of the position of the block above it, said offset being a smaller number of bits than there are bits in the vertical and horizontal dimensions of said block, and rearranging the image blocks so that each block in each column is exactly above or below the other blocks in the column, and each block in each row is said number of bits above the level of the block to its left.

4. A method of the counterclockwise rotation of less than forty-five degrees of an image stored in memory in the form of blocks of digital bits comprising the steps of:

dividing the image into rows and columns of blocks, each block in each column located exactly above or below the other blocks in the same column, and each block in each row offset a number of bits below the level of the block to its left, said offset being a smaller number of bits than there are bits in the vertical and horizontal dimensions of said block, and rearranging the image blocks so that each block in each row is exactly to the right or left of the other blocks in the row, and each block in each column is said number of bits to the right of the position of the block above it.

* * * * *